United States Patent
Liu

(10) Patent No.: US 10,678,624 B2
(45) Date of Patent: Jun. 9, 2020

(54) IDENTIFYING POTENTIAL SOLUTIONS FOR ABNORMAL EVENTS BASED ON HISTORICAL DATA

(71) Applicant: Alibaba Group Holding Limited, George Town (KY)

(72) Inventor: Lu Liu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 174 days.

(21) Appl. No.: 15/975,602

(22) Filed: May 9, 2018

(65) Prior Publication Data

US 2018/0260266 A1 Sep. 13, 2018

Related U.S. Application Data

(63) Continuation of application No. PCT/CN2016/104184, filed on Nov. 1, 2016.

(30) Foreign Application Priority Data

Nov. 10, 2015 (CN) .......................... 2015 1 0763290

(51) Int. Cl.
 - *G06F 11/07* (2006.01)
 - *G06F 16/958* (2019.01)
 - *G06F 16/00* (2019.01)

(52) U.S. Cl.
 CPC ............ *G06F 11/079* (2013.01); *G06F 11/07* (2013.01); *G06F 11/0709* (2013.01);
 (Continued)

(58) Field of Classification Search
 CPC ............................ G06F 11/079; G06F 11/0793
 (Continued)

(56) References Cited

U.S. PATENT DOCUMENTS 7,418,634 B2  8/2008  Okuhara et al.
8,051,335 B1  11/2011  Reimers et al.
(Continued)

FOREIGN PATENT DOCUMENTS

CN  101741622  6/2010
CN  101848477  9/2010
(Continued)

OTHER PUBLICATIONS

International Search Report by the International Searching Authority issued in International Application No. PCT/CN2016/104184 dated Feb. 6, 2017; 9 pages.
(Continued)

*Primary Examiner* — Chae M Ko
(74) *Attorney, Agent, or Firm* — Fish & Richardson P.C.

(57) ABSTRACT

Techniques for identifying potential solutions for abnormal events based on historical data are described. One example method includes obtaining interaction data between a client device and a server; determining whether an abnormal event exists in the obtained interaction data; in response to determining, obtaining attribute information of a user corresponding to the client device from the obtained interaction data; identifying one or more records in a database, each record including the attribute information, a cause of one or more previous abnormal events, and a weight characterizing a severity of the previous abnormal events; determining a cause of the abnormal event, wherein the determined cause is the same as the cause of the previous abnormal events from the record in the identified one or more records that includes a largest weight; and providing a solution to address the abnormal event based on the determined cause.

20 Claims, 6 Drawing Sheets

(52) U.S. Cl.
CPC ......... *G06F 11/0751* (2013.01); *G06F 16/00* (2019.01); *G06F 16/958* (2019.01)

(58) Field of Classification Search
USPC .......................................................... 714/26
See application file for complete search history.

(56) References Cited

U.S. PATENT DOCUMENTS

| | | | |
|---|---|---|---|
| 9,946,982 B2* | 4/2018 | Van Riel | G06Q 30/0201 |
| 2006/0039708 A1* | 2/2006 | Doty | G03G 15/553 399/24 |
| 2006/0242200 A1* | 10/2006 | Horowitz | G05B 15/02 |
| 2008/0263404 A1* | 10/2008 | Vidiyala | G06F 11/0748 714/38.14 |
| 2014/0115386 A1 | 4/2014 | Huang | |
| 2017/0091008 A1* | 3/2017 | Cherbakov | G06F 11/079 |
| 2018/0210808 A1* | 7/2018 | Shanmugam | H04L 41/5067 |

FOREIGN PATENT DOCUMENTS

| | | |
|---|---|---|
| CN | 102081631 | 6/2011 |
| CN | 103152219 | 6/2013 |
| CN | 103974299 | 8/2014 |
| CN | 103997416 | 8/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Application No. 16863561.3, dated Nov. 7, 2018, 13 pages.
PCT International Preliminary Report on Patentability in International Application No. PCT/CN2016/104184, dated May 15, 2018, 10 pages (with English Translation).
PCT Written Opinion of the International Searching Authority in International Application No. PCT/CN2016/104184, dated Feb. 6, 2017, 9 pages (with English translation).

* cited by examiner

IDENTIFYING POTENTIAL SOLUTIONS FOR ABNORMAL EVENTS BASED ON HISTORICAL DATA

This application is a continuation of PCT Application No. PCT/CN2016/104184, filed on Nov. 1, 2016, which claims priority to Chinese Patent Application No. 201510763290.X, filed on Nov. 10, 2015, and each application is hereby incorporated by reference in its entirety.

TECHNICAL FIELD

The present invention relates to the field of computer technologies, and more particularly, to techniques for identifying potential solutions for abnormal events based on historical data.

BACKGROUND

Currently, a user often performs operations such as browsing a web page, making an online payment, or registering an account on a terminal device. However, sometimes these operations cannot be successfully performed for various reasons. For example, online payment can fail or a web page browsed cannot be displayed.

Generally, when encountering a problem, a user usually calls a customer service representative for help. After the call is connected, the user needs to describe the problem to the customer service representative, such as a symptom related to the problem, latest operations performed by the user, or information returned by a server. The customer service representative determines a cause of the problem based on description from the user and expertise of the customer service representative, and then helps the user resolve the problem.

However, the user sometimes cannot clearly describe the problem, or the customer service representative cannot thoroughly understand the description from the user right away because of different perspectives of the problem. As a result, it can take additional communication time for the customer service representative to determine the cause of the problem, thereby increasing labor costs.

SUMMARY

To overcome problems in related technologies, the present invention provides a data processing method and apparatus.

According to a first aspect of implementations of the present invention, a data processing method is provided and applied to a server, where the method includes: obtaining interaction data between a user and the server; detecting, based on the interaction data, whether an abnormal event has occurred; obtaining attribute information of the user when an abnormal event occurred; searching a locally stored first correspondence between attribute information corresponding to the abnormal event, a cause, and a weight for a record that includes the attribute information and a largest weight; and determining a cause in the record as a cause of the abnormal event.

The method further includes: processing the abnormal event based on the determined cause. When a plurality of abnormal events have occurred, the processing of the abnormal event based on the determined cause includes: sorting the plurality of abnormal events in a predetermined abnormal event order; and sequentially processing, in an order of the sorted abnormal events, the abnormal events based on causes of the abnormal events until the abnormal events are processed.

The processing of the abnormal event based on the determined cause includes: obtaining a locally stored second correspondence between a cause corresponding to the abnormal event and a processing solution; obtaining, from the second correspondence, a processing solution corresponding to the determined cause; and processing the abnormal event based on the processing solution.

After the processing of the abnormal event based on the determined cause, the method further includes: receiving feedback data that is fed back by the user based on a processing result obtained from the server that has processed the abnormal event; and when the feedback data includes an agreement identifier, adding a weight in a record that includes the attribute information and the determined cause to the first correspondence; or when the feedback data includes a disagreement identifier, receiving a cause of the abnormal event that is sent by a customer service representative, where the received cause is sent after the customer service representative interacts with the user; and if the first correspondence includes a record that includes the attribute information and the received cause, adding a weight in the record that includes the attribute information and the received cause; or if the first correspondence does not include a record that includes the attribute information and the received cause, setting an initial weight, and storing the attribute information, the received cause, and the initial weight in the first correspondence as a single record.

Based on a second aspect of the implementations of the present invention, a data processing apparatus is provided and applied to a server, where the apparatus includes: a first acquisition module, configured to obtain interaction data between a user and the server; a detection module, configured to detect, based on the interaction data, whether an abnormal event occurred; a second acquisition module, configured to obtain attribute information of the user when an abnormal event occurred; a search module, configured to search a locally stored first correspondence between attribute information corresponding to the abnormal event, a cause, and a weight for a record that includes the attribute information and a largest weight; and a determining module, configured to determine a cause in the record as a cause of the abnormal event.

The apparatus further includes: a processing module, configured to process the abnormal event based on the determined cause. When a plurality of abnormal events have occurred, and the processing module includes: a sorting unit, configured to sort the plurality of abnormal events in a predetermined abnormal event order; and a first processing unit, configured to sequentially process, in an order of the sorted abnormal events, the abnormal events based on causes of the abnormal events until the abnormal events are processed.

The processing module includes: a first acquisition unit, configured to obtain a locally stored second correspondence between a cause corresponding to the abnormal event and a processing solution; a second acquisition unit, configured to obtain, from the second correspondence, a processing solution corresponding to the determined cause; and a second processing unit, configured to process the abnormal event based on the processing solution.

The apparatus further includes: a first receiving module, configured to receive feedback data that is fed back by the user based on a processing result obtained from the server that has processed the abnormal event; and a first addition module, configured to: add a weight in a record that includes the attribute information and the determined cause to the first correspondence, when the feedback data includes an agreement identifier; or a second receiving module, configured to: receive a cause of the abnormal event that is sent by a customer service representative, when the feedback data includes a disagreement identifier, where the received cause is sent after the customer service representative interacts with the user; and a second addition module, configured to: add a weight in the record that includes the attribute information and the received cause, if the first correspondence includes a record that includes the attribute information and the received cause; or a storage module, configured to: set an initial weight, store the attribute information, the received cause, and the initial weight in the first correspondence as a single record, if the first correspondence does not include a record that includes the attribute information and the received cause.

The technical solutions provided in the implementations of the present invention can deliver the following beneficial effects: In the present invention, the interaction data between the user and the server is obtained; whether an abnormal event occurred is detected based on the interaction data; when an abnormal event occurred, the attribute information of the user is obtained; and the locally stored first correspondence between the attribute information corresponding to the abnormal event, the cause, and the weight is searched to identify the record that includes the attribute information and the largest weight; and the cause in the record is determined as the cause of the abnormal event. In this process, the user does not need to communicate with the customer service representative, the customer service representative does not need to determine the cause of the abnormal event by communicating with the user, and the cause of the abnormal event can be determined by using the attribute information of the user and the first correspondence between the attribute information corresponding to the abnormal event, the cause, and the weight. Therefore, labor costs are saved.

It should be understood that the previous general description and the following detailed description are only examples and are explanatory. They do not limit the present invention.

BRIEF DESCRIPTION OF DRAWINGS

The accompanying drawings herein are incorporated in the specification, constitute a part of the specification, show implementations that are in accordance with the present invention, and are used with the specification to explain principles of the present invention.

DESCRIPTION OF EMBODIMENTS

Example implementations are described in detail here, and examples of the implementations are presented in the accompanying drawings. When the following description relates to the accompanying drawings, unless specified otherwise, same numbers in different accompanying drawings represent same or similar elements. Implementations described in the following implementations do not represent implementations based on the present invention. Instead, they are only examples of apparatus and methods based on some aspects of the present invention that are described in detail in the appended claims.

Figure 1:
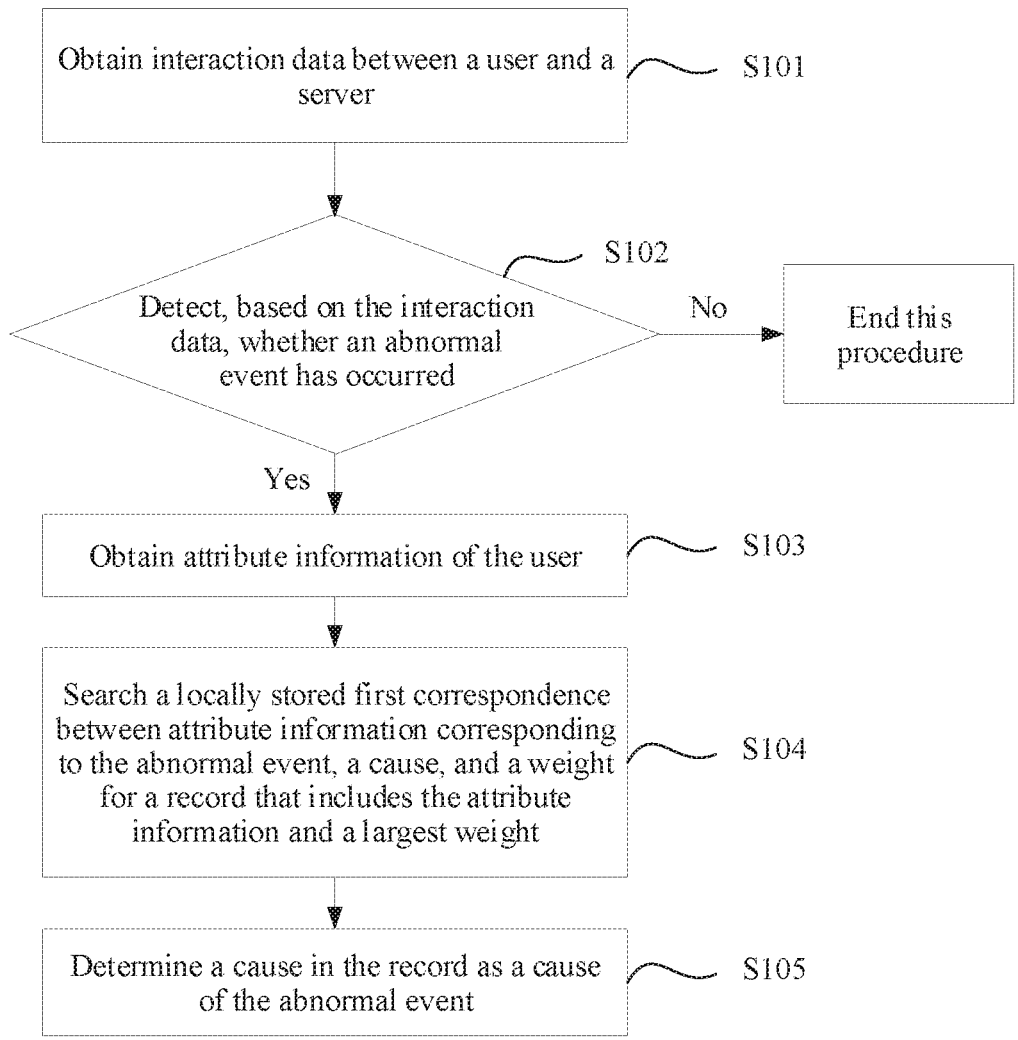
FIG. 1 is a flowchart illustrating a data processing method based on an example implementation.

FIG. 1 is a flowchart illustrating a data processing method based on an example implementation. As shown in FIG. 1, the method is applied to a server, and the method includes the following steps.

In step S101, interaction data between a user and the server is obtained.

The interaction data includes data sent by the user to the server and data returned by the server to the user.

For example, when the user needs to obtain a web page, the user can send to the server, an acquisition request used to obtain the web page, where the acquisition request includes a link of the web page. After receiving the acquisition request, the server obtains the web page based on the link, and can return an acquisition response to the user based on the acquisition request. The acquisition request and the acquisition response are interaction data between the user and the server.

As another example, when needing to pay for an item online, the user sends a payment request to the server, where the payment request includes a user account, cost of the item, and a seller account. After receiving the payment request, the server processes the payment request, for example, deducting the cost of the item from a balance included in the user account, then adding the deducted cost of the item to a balance of the seller account, and then returns a payment response to the user. The payment request and the payment response are interaction data between the user and the server.

In step S102, whether an abnormal event occurred is detected based on the interaction data.

For example, when a format of a link included in the acquisition request sent by the user to the server and used to obtain the web page is incorrect, the server cannot obtain the web page based on the link. It returns an acquisition response to the user to notify that the web page is not obtained. The acquisition response is interaction information between the user and the server, and the acquisition response indicates that the web page is not successfully obtained. Therefore, it can be determined that an abnormal event occurred.

As another example, after receiving the payment request, the server deducts the cost of the item from the balance included in the user account. However, if the balance included in the user account is less than the price of the item, the cost of the item cannot be successfully deducted from the balance of the user account, and the cost of the item cannot be added to the balance included in the seller account. As a result, the processing request fails to be processed, and a payment response used to notify that the acquisition request fails to be processed is returned to the user. The payment response is interaction information between the user and the server, and the payment response indicates that payment for the item is unsuccessful. Therefore, it can be determined that an abnormal event occurred.

When an abnormal event occurs, in step S103, attribute information of the user is obtained.

The attribute information of the user can be gender, age, etc. of the user stored in the user account, whether the user account is bound to a bank card, whether real-name authentication is performed for the user account, whether a payment function of the user account is enabled, etc.

In step S104, a locally stored first correspondence between attribute information corresponding to the abnormal event, a cause, and a weight is searched to identify a record that includes the attribute information and the largest weight.

The first correspondence between the attribute information corresponding to the abnormal event, the cause, and the weight can be obtained in advance by a technician through configuration, or can be obtained by the server through auto-learning.

The server can obtain, through auto-learning, the first correspondence between the attribute information corresponding to the abnormal event, the cause, and the weight using the following process:

In a historical process, when an abnormal event occurred during interaction between a user and the server, a customer service representative can communicate with the user. During communication, the customer service representative determines attribute information of the user and a cause of the abnormal event based on information about the abnormal event described by the user, and then enters the determined attribute information of the user and the determined cause provided to the server. The server receives the attribute information and the cause entered by the customer service representative.

The locally stored first correspondence between the attribute information corresponding to the abnormal event, the cause, and the weight are searched to identify a record that includes the attribute information and the cause entered by the customer service representative. When a record includes the attribute information and the cause entered by the customer service representative, a weight in the record that includes the attribute information and the cause entered by the customer service representative is added. When no record includes the attribute information and the cause entered by the customer service representative, an initial weight is set, and the attribute information and the cause entered by the customer service representative, and the initial weight are stored in the first correspondence as a single record.

Any records in the first correspondence include attribute information, a cause, and a weight. In a historical process, when the attribute information of the user is the attribute information in the record, and the cause is the cause in the record, the weight can be a quantity of times the abnormal event occurred. This holds true for other records in the first correspondence.

Therefore, in this step, the first correspondence can be searched to identify records that include the attribute information. When a record includes the attribute information, the record that includes the largest weight is selected from the records that includes the attribute information, and step S105 is performed.

However, if no record includes the attribute information, to accurately determine the cause of the abnormal event, the server can associate a connection between the server and the user's terminal device with a connection between the server and the customer service representative's terminal device, so that the terminal device of the user is directly connected to the terminal device of the customer service representative, and the customer service representative can directly communicate with the user. During communication, the customer service representative can determine the cause of the abnormal event based on information of the abnormal event described by the user, and then enters the determined cause provided to the server. The server receives the cause entered by the customer service representative, determines the cause entered by the customer service representative as the cause of the abnormal event, sets an initial weight, and stores the obtained attribute information of the user, the cause entered by the customer service representative, and the initial weight in the first correspondence as a single record.

For example, in this implementation of the present invention, the first correspondence between the attribute information corresponding to the abnormal event, the cause, and the weight can be a decision tree model. For example, a root node in the decision tree model stores an abnormal event. The root node points to at least one level-2 node. Each level-2 node can store attribute information, and each level-2 node can point to at least one level-3 node. Each level-3 node can store a cause. A weight is set between each level-2 node and a level-3 node that the level-2 node points to.

Figure 2:
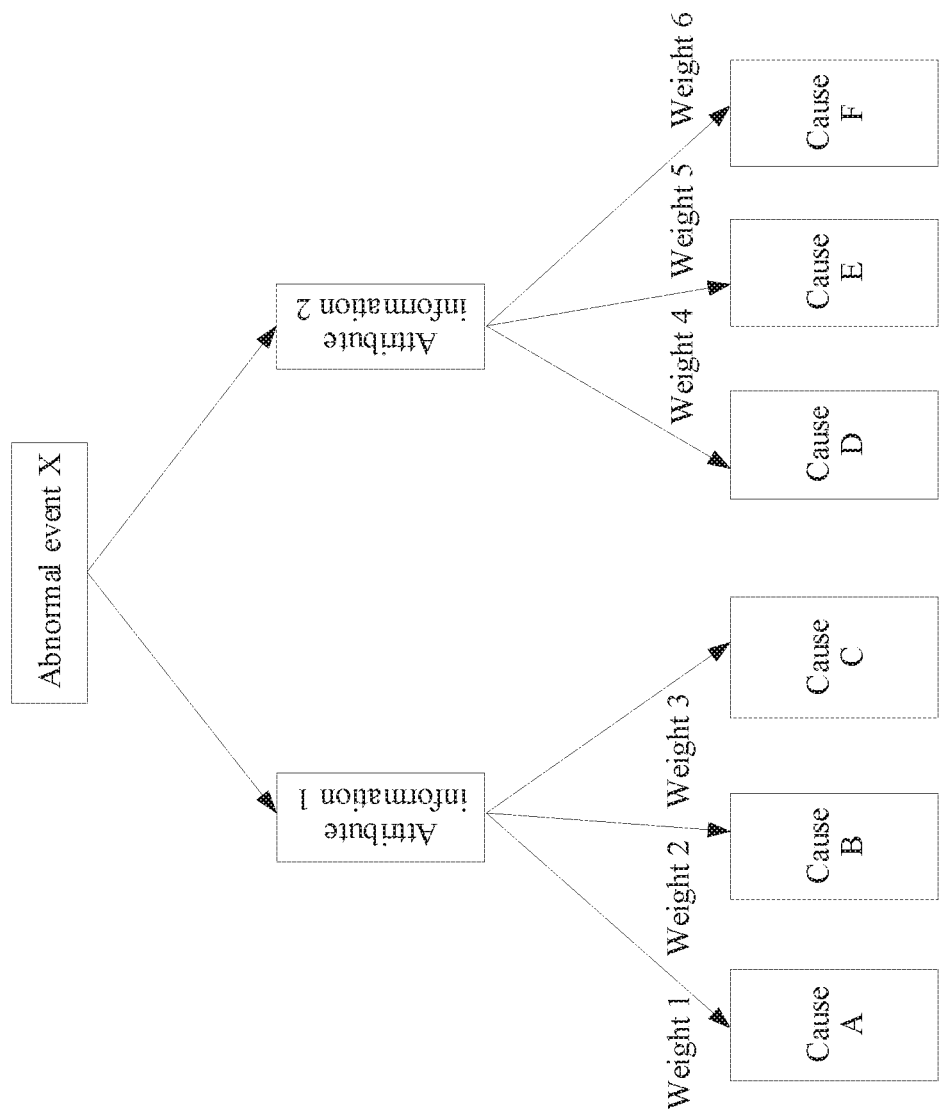
FIG. 2 is a schematic diagram illustrating a decision tree model based on an example implementation.

As shown in FIG. 2, the root node stores an abnormal event X, the root node points to two level-2 nodes: a first level-2 node and a second level-2 node, the first level-2 node stores attribute information 1, and the second level-2 node stores attribute information 2.

The first level-2 node points to three level-3 nodes: a first level-3 node, a second level-3 node, and a third level-3 node. The first level-3 node stores a cause A, the second level-3 node stores a cause B, and the third level-3 node stores a cause C.

Weight 1 is set between the first level-2 node and the first level-3 node that the first level-2 node points to, weight 2 is set between the first level-2 node and the second level-3 node that the first level-2 node points to, and weight 3 is set between the first level-2 node and the third level-3 node that the first level-2 node points to.

The second level-2 node points to three level-3 nodes: a fourth level-3 node, a fifth level-3 node, and a sixth level-3 node. The fourth level-3 node stores cause D, the fifth level-3 node stores cause E, and the sixth level-3 node stores cause F.

Weight 4 is set between the second level-2 node and the fourth level-3 node that the second level-2 node points to, weight 5 is set between the second level-2 node and the fifth level-3 node that the second level-2 node points to, and weight 6 is set between the second level-2 node and the sixth level-3 node that the second level-2 node points to.

Assume that when abnormal event X occurred, the attribute information of the user is the attribute information 1. In the decision tree model shown in FIG. 2, starting from the root node, the level-2 nodes that the root node points to can be searched to identify a level-2 node that stores the attribute information 1, and it is identified that the level-2 node that stores the attribute information 1 is the first level-2 node.

Because each level-3 node that the first level-2 node points to stores a different cause, starting from the first level-2 node, the level-3 nodes that the first level-2 node points to can be searched to identify a level-3 node that has the largest weight with the first level-2 node, and a cause stored in the identified level-3 node is determined as a cause of the abnormal event X. Assume that weight 2 is greater than weight 1, and weight 1 is greater than weight 3. The weight between the second level-3 node and the first level-2 node is the largest weight, cause B stored in the second level-3 node is then determined as the cause of the abnormal event X.

In step S105, a cause in the record is determined as a cause of the abnormal event.

If a plurality of records are selected in step S104, that is, in the first correspondence, there are a plurality of records that include the attribute information that have the largest weight, a record is randomly selected from the plurality of selected records, and a cause associated with the selected record is determined as the cause of the abnormal event. If a record is selected in step S104, a cause associated with the selected record is determined as the cause of the abnormal event.

In the implementation of the present invention shown in FIG. 1, the interaction data between the user and the server is obtained; whether an abnormal event occurred is detected based on the interaction data; when an abnormal event occurred, the attribute information of the user is obtained; and the locally stored first correspondence between the attribute information corresponding to the abnormal event, the cause, and the weight is searched to identify the record that includes the attribute information and the largest weight; and the cause in the record is determined as the cause of the abnormal event. In this process, the user does not need to communicate with the customer service representative, the customer service representative does not need to determine the cause of the abnormal event by communicating with the user, and the cause of the abnormal event can be determined by using the attribute information of the user and the first correspondence between the attribute information corresponding to the abnormal event, the cause, and the weight. Therefore, labor costs can be saved.

Figure 3:
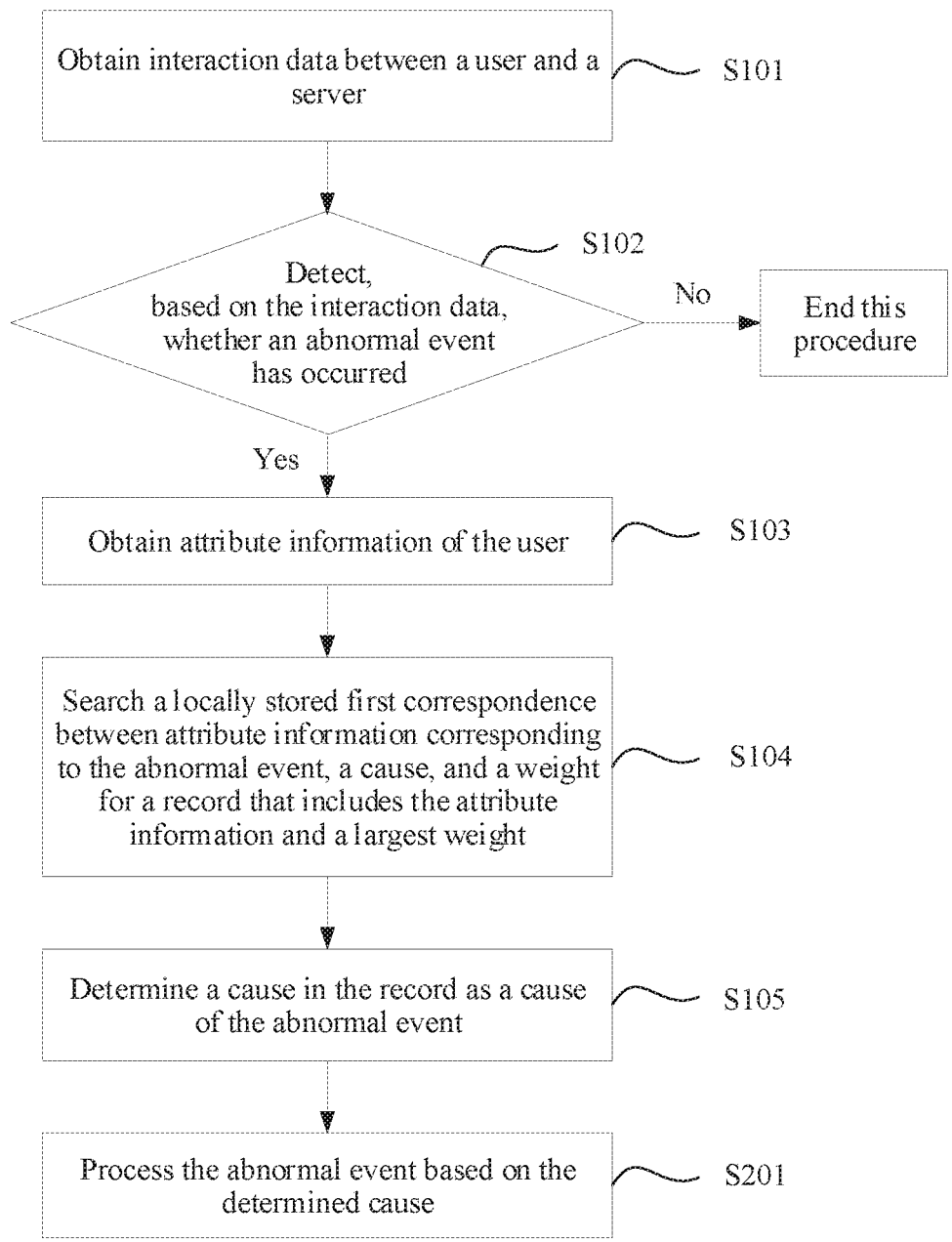
FIG. 3 is a flowchart illustrating a data processing method based on an example implementation.

Generally, when the cause of the abnormal event is determined, help needs to be provided for the user to resolve the abnormal event. Therefore, in another implementation of the present invention, referring to FIG. 3, the method further includes the following steps.

In step S201, the abnormal event is processed based on the determined cause.

In this implementation of the present invention, for the abnormal event, a technician collects common causes of the abnormal event in advance in a historical process, and a processing solution corresponding to each cause. For example, when the user fails to pay for an item online, the abnormal event is a payment failure. It is then determined that the cause of the abnormal event is that the balance in the user account is insufficient, and a preferred solution is to directly send a refill page used to refill the user account. As such, after receiving the refill page, the user can directly refill the user account with sufficient amount by using the refill page, and then payment can be successfully performed by using the amount, so as to resolve the abnormal event. For any causes of the abnormal event, the server can store the cause and a solution corresponding to the cause in a locally stored second correspondence between the cause of the abnormal event and a corresponding solution as a single record. For other causes of the event, previous operations can be similarly performed.

Therefore, in this step, the second correspondence between the cause of the abnormal event and the corresponding solution can be obtained; a solution corresponding to the determined cause is obtained from the second correspondence; and the abnormal event is processed based on the obtained solution.

In addition, in the previous implementation, a plurality of different abnormal events can sometimes be determined. In such case, the server needs to sequentially process these abnormal events. Technicians can set an abnormal event processing order in the server in advance, and the abnormal event processing order can store identifiers of the abnormal events in an order based on processing priorities.

Therefore, in this implementation, when a plurality of different abnormal events are determined, the plurality of determined abnormal events can be determined in the predetermined abnormal event processing order; and the abnormal events are sequentially processed in an order obtained after sorting and based on causes of the abnormal events until the abnormal events are processed.

After the server processes the abnormal event based on the determined cause, a processing result is obtained, which can be a processing success or a processing failure.

For example, when the abnormal event is a payment failure, after the server processes the abnormal event, if the user can successfully perform payment during a retry, the processing result can indicate that the processing has succeeded. Or after the server processes the abnormal event, if the user still fails to perform payment during a retry, the processing result can indicate that processing has failed.

In this implementation, the user can provide feedback to the processing result of the server. The feedback includes an agreement on the processing result of the abnormal event or a disagreement on the processing result.

For example, after the server processes the abnormal event, if the user can successfully perform payment during a retry, the user can agree with the processing result obtained from the server that processed the abnormal event. After the server processes the abnormal event, if the user still fails to perform payment during a retry, the user can disagree with the processing result obtained from the server that processed the abnormal event.

Figure 4:
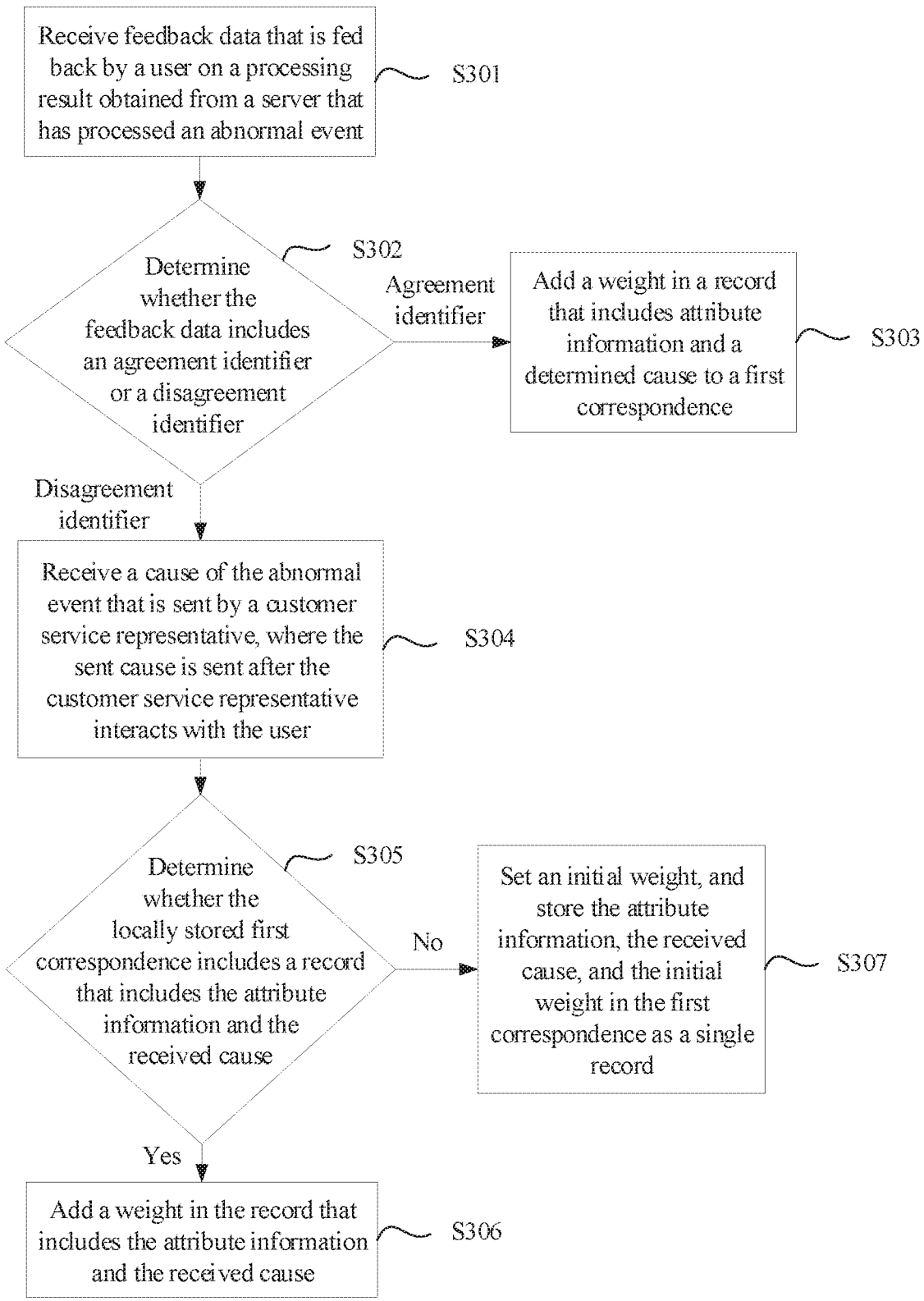
FIG. 4 is a flowchart illustrating a data processing method based on an example implementation.

In still another implementation, to improve accuracy of subsequently determining the cause of the abnormal event by the server based on the first correspondence, the server can update the first correspondence based on the feedback from the user. Referring to FIG. 4, the method further includes the following steps.

In step S301, feedback data that is fed back by the user based on a processing result obtained from the server that has processed the abnormal event is received.

The feedback data can include a predetermined flag bit. The predetermined flag bit can store an agreement identifier or a disagreement identifier. For example, "1" can indicate the agreement identifier, and "0" can indicate the disagreement identifier.

When the user agrees with the processing result obtained from the server that has processed the abnormal event, the user can trigger, on the terminal device, an agreement button that indicates an agreement of the processing result. When the trigger operation of triggering the agreement button is received from the user, the terminal device generates the feedback data, adds the agreement identifier "1" to the predetermined flag bit in the feedback data, and then sends, to the server, the feedback data that the agreement identifier "1" is added to. After receiving the feedback data, the server determines whether an identifier included in the feedback data is the agreement identifier "1" or the disagreement identifier "0", and when it is determined that the feedback data includes the agreement identifier "1", the feedback data is determined to be agreement feedback data.

In the previous implementation, when the server determines the cause of the abnormal event, the first correspondence between the attribute information corresponding to the abnormal event, the cause, and the weight is searched to identify the record that includes the attribute information, the record that includes the largest weight is selected from the identified record that includes the attribute information. Then the cause associated with the record that includes the largest weight is used as the cause of the abnormal event.

However, a real cause of the abnormal event may not be the cause associated with the record that includes the largest weight. When the cause is incorrectly determined, because a solution is obtained based on the determined cause, it cannot resolve the abnormal event.

For example, the abnormal event is the payment failure, the attribute information does not include real-name authentication of the user account, and the user account is not bound to a bank card, and the cause associated with the record that includes the largest weight is that the balance in the account is insufficient, but the cause of the present abnormal event is that the payment function of the user account is disabled. A solution for cause from insufficient balance is to directly send the refill page used to refill the user account to the user. A solution for cause from disabled payment function is to provide to the user, an application page to apply for enabling the payment function. Therefore, the abnormal event of the present payment failure cannot be resolved by directly sending the refill page used to refill the user account to the user.

Further, the user does not agree with the processing result obtained from the server that has processed the abnormal event based on the determined cause. When the user does not agree with the processing result obtained from the server that has processed the abnormal event based on the determined cause, the user can trigger, on the terminal device, a disagreement button used to indicate a disagreement on the processing result. When receiving the trigger operation of triggering the disagreement button by the user, the terminal device can generate the feedback data, add the disagreement identifier "0" to the predetermined flag bit in the feedback data, and send, to the server, the feedback data that the disagreement identifier "0" is added to. The server receives the feedback data, determines whether an identifier included in the feedback data is the agreement identifier "1" or the disagreement identifier "0", and when it is determined that the feedback data includes the disagreement identifier "0", determines that the feedback data is disagreement feedback data.

In step S302, whether the feedback data includes an agreement identifier or a disagreement identifier is determined.

When the feedback data includes the agreement identifier, in step S303, a weight in a record that includes the attribute information and the determined cause is added to the first correspondence.

When the feedback data includes the agreement identifier, it is determined that the user agrees with the processing result obtained from the server that has processed the abnormal event based on the determined cause, the weight in the record that includes the attribute information, and the determined cause added to the first correspondence, so as to update the first correspondence based on the user feedback data.

When the feedback data includes the disagreement identifier, in step S304, a cause of the abnormal event sent by a customer service representative is received. The received cause is sent after the customer service representative interacts with the user.

When the feedback data includes the disagreement identifier, it is determined that the user does not agree with the processing result obtained from the server that has processed the abnormal event based on the determined cause, and it is likely that the cause of the abnormal event that is determined by the server in the previous implementation is not the real cause of the abnormal event. When the cause is incorrectly determined, because a solution is obtained based on the cause determined by the server, it cannot resolve the abnormal event.

Therefore, to resolve the abnormal event, in this implementation of the present invention, the server can associate the connection between the server and the user's terminal device with the connection between the server and the customer service representative's terminal device, so that the user terminal device is directly connected to the customer service representative's terminal device. The customer service representative can then directly communicate with the user. During the communication, the customer service representative can determine the cause of the abnormal event based on information about the abnormal event described by the user, and then enters the determined cause provided to the server. The server receives the cause entered by the customer service representative. Generally, the cause of the abnormal event that is determined after the customer service representative communicates with the user is usually the real cause of the abnormal event, and therefore step S305 can be performed.

In still another implementation of the present invention, after receiving the cause entered by the customer service representative, the server can process the abnormal event based on the entered cause. Then, the user can continue to provide feedback based on a processing result obtained from the server that has processed the abnormal event based on the entered cause. When the server receives feedback data on this processing result from the user, if the feedback data includes the disagreement identifier, it indicates that the server still fails to help the user resolve the abnormal event, and the previous steps are repeatedly performed until feedback data that includes the agreement identifier is received from the user. If the feedback data includes the agreement identifier, it can be determined that the user agrees with the processing result obtained from the server that has processed the abnormal event based on the received cause, or it can be determined that the server has helped the user resolve the abnormal event, and step S305 is performed.

In step S305, whether the locally stored first correspondence includes a record that includes the attribute information and the received cause is determined.

If the first correspondence includes the record that includes the attribute information and the received cause, a weight in the record that includes the attribute information and the received cause is added in step S306.

If the first correspondence does not include the record that includes the attribute information and the received cause, in step S307, an initial weight is set, and the attribute information, the received cause, and the initial weight are stored in the first correspondence as a single record.

Figure 5:
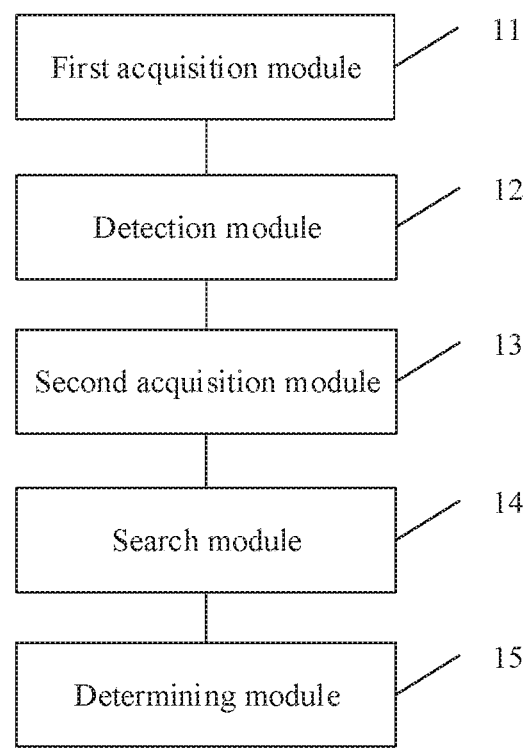
FIG. 5 is a block diagram illustrating a data processing apparatus based on an example implementation.

FIG. 5 shows a data processing apparatus applicable to a server, based on an example implementation. Referring to FIG. 5, the apparatus includes a first acquisition module 11, configured to obtain interaction data between a user and the server; a detection module 12, configured to detect, based on the interaction data, whether an abnormal event occurred; a second acquisition module 13, configured to obtain attribute information of the user when an abnormal event occurred; a search module 14, configured to search a locally stored first correspondence between attribute information corresponding to the abnormal event, a cause, and a weight for a record that includes the attribute information and a largest weight; and a determining module 15, configured to determine a cause in the record as a cause of the abnormal event.

In the implementation shown in FIG. 5, the interaction data between the user and the server is obtained; whether an abnormal event occurred is detected based on the interaction data; when an abnormal event occurred, the attribute information of the user is obtained; and the locally stored first correspondence between the attribute information corresponding to the abnormal event, the cause, and the weight is searched to identify the record that includes the attribute information and the largest weight; and the cause in the record is determined as the cause of the abnormal event. In this process, the user does not need to communicate with a customer service representative, the customer service representative does not need to determine the cause of the abnormal event by communicating with the user, and the cause of the abnormal event can be determined by using the attribute information of the user and the first correspondence between the attribute information corresponding to the abnormal event, the cause, and the weight. Therefore, labor costs can be saved.

Further, the apparatus can further include a processing module, configured to process the abnormal event based on the determined cause.

If a plurality of abnormal events occurred, the processing module can include a sorting unit, configured to sort the plurality of abnormal events in a predetermined abnormal event order; and a first processing unit, configured to sequentially process, in an order of the sorted abnormal events, the abnormal events based on causes of the abnormal events until the abnormal events are processed.

The processing module includes a first acquisition unit, configured to obtain a locally stored second correspondence between a cause corresponding to the abnormal event and a processing solution; a second acquisition unit, configured to obtain, from the second correspondence, a processing solution corresponding to the determined cause; and a second processing unit, configured to process the abnormal event based on the processing solution.

Further, the apparatus further includes a first receiving module, configured to receive feedback data that is fed back by the user based on a processing result obtained from the server that has processed the abnormal event; and a first addition module, configured to add a weight in a record that includes the attribute information and the determined cause to the first correspondence, when the feedback data includes an agreement identifier; or a second receiving module, configured to receive a cause of the abnormal event that is sent by a customer service representative, when the feedback data includes a disagreement identifier, and where the received cause is sent after the customer service representative interacts with the user; and a second addition module, configured to add a weight in the record that includes the attribute information and the received cause, if the first correspondence includes a record that includes the attribute information and the received cause; or a storage module, configured to set an initial weight, and store the attribute information, the received cause, and the initial weight in the first correspondence as a single record, if the first correspondence does not include a record that includes the attribute information and the received cause.

For the apparatus in the previous implementation, a specific manner in which each module performs an operation has been described in detail in the related method implementation, and repetitive details are omitted here for simplicity.

A person skilled in the art can easily figure out another implementation solution of the present invention after considering the specification and practicing the present invention disclosed here. The present application is intended to cover any variations, functions, or adaptive changes. These variations, functions, or adaptive changes comply with general principles of the present invention, and can encompass common knowledge or a commonly used technical means in the technical field that are not disclosed in the present invention. The specification and the implementations are merely considered as examples, and the actual scope and the spirit of the present invention are pointed out by the appended claims.

It should be understood that the present invention is not limited to the exact structures that are described above and that are shown in the accompanying drawings. Modifications and changes can be made without departing from the scope of the present invention. The scope of the present invention is defined only by the appended claims.

Figure 6:
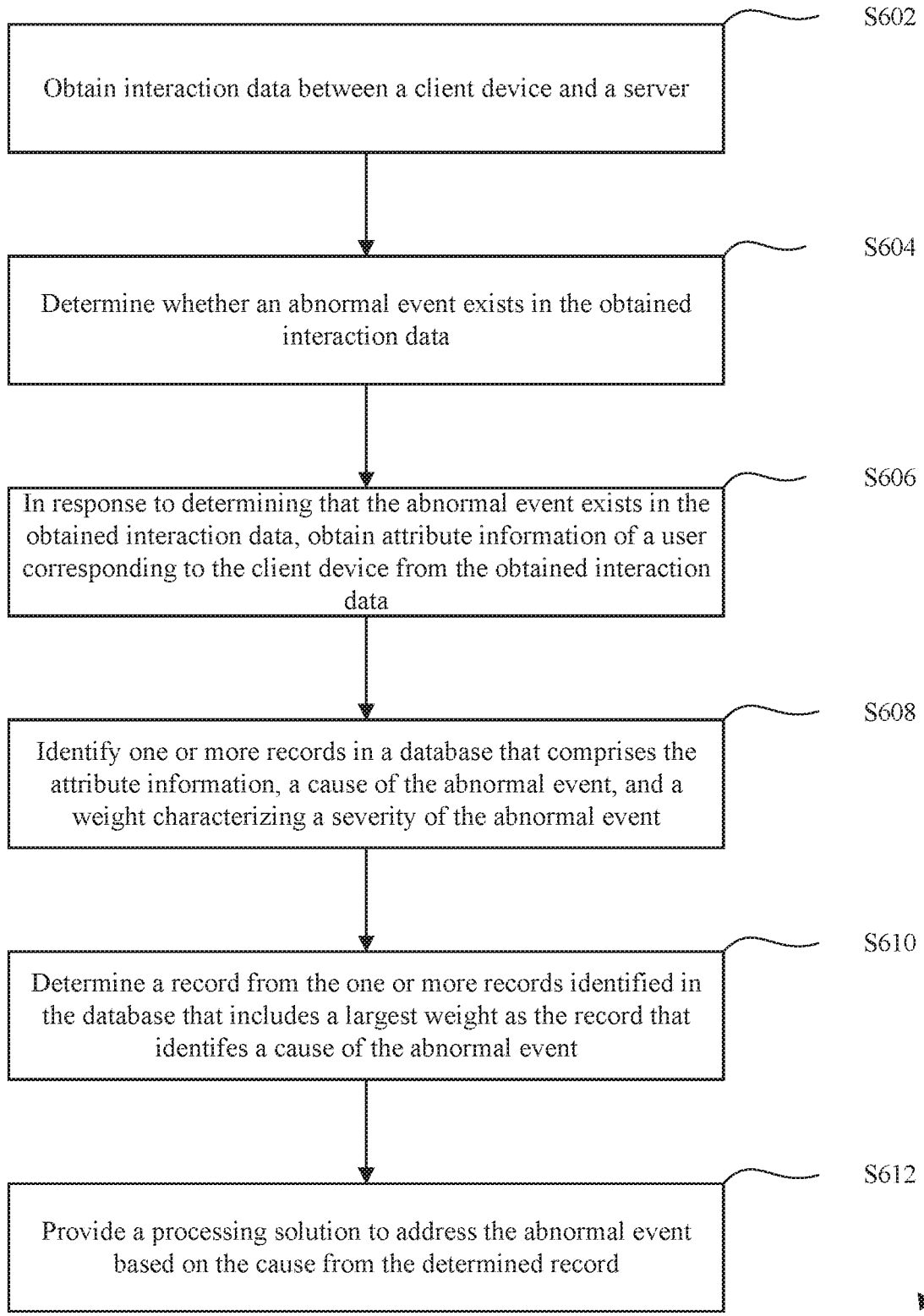
FIG. 6 is a flowchart illustrating an example of a computer-implemented method for identifying potential solutions for abnormal events based on historical data, according to an implementation of the present disclosure.

FIG. 6 is a flowchart illustrating an example of a computer-implemented method for identifying potential solutions for abnormal events based on previous behavior, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At S602, the server obtains interaction data between client device and the server. In some implementations, the interaction data includes acquisition request data and acquisition response data. The client device transmits acquisition request data that indicates requested information from the user. For example, the acquisition request data can include a URL link to a website. The server receives the acquisition request data, retrieves a web page corresponding to the requested URL link, and provides an acquisition response that includes the web page to the client device. From S602, method 600 proceeds to S604.

At S604, the server determines whether an abnormal event exists in the obtained interaction data. In some implementations, the server determines whether an abnormal event exists in the acquisition request data. For example, the acquisition request data that includes a requested URL link may have a spelling error. As a result, the server may not be able to respond with an appropriate or accurate web page in the acquisition response. This leads to an abnormal event in the obtained interaction data. In other implementations, the server determines whether an abnormal event exists in the acquisition response data. For example, the web page may not return properly, even with a correct URL link. Additionally, the server may not be able to communicate with the client device as an abnormal event. The server flags any of these examples as abnormal events from the obtained interaction data. From S604, method 600 proceeds to S606.

At S606, in response to determining that the abnormal event exists in the obtained information data, the server obtains attribute information of a user corresponding to the client device from the obtained interaction data. The server obtains various attribute information of use that includes the user's gender, age, credentials of a user that include a username and password, whether the user account is tied to a bank card, whether real-name authentication is performed for the user account, whether a payment function of the user account is enabled, and client device specifics of the user, to name a few examples. The server obtains the attribute information and stores the attribute information in memory. From S606, method 600 proceeds to S608.

At S608, the server identifies one or more records in a database that comprises the attribute information, a cause of the abnormal event, and a weight characterizing a severity of the abnormal event. In some implementations, the server scans through its database for any records that match and/or include the attribute information from the user. If the server finds any matches from its database that include the attribute information from the user, the server then retrieves a cause of an abnormal event and a weight characterizing the severity of that abnormal event from each of the retrieved records. From S608, method 600 proceeds to S610.

At S610, the server determines a record from the one or more records identified in the database that includes a largest weight as the record that identifies a cause of the abnormal event. In some implementations, the server searches through a database of one or more records. In particular, the server compares the weights from each of the retrieved record and determines the record with the largest weight as the record to use for resolving the abnormal event. The weight value can indicate a number of times the abnormal event has occurred for the user of the corresponding attribute information. In other implementations, the weight can be assigned as a percentage as to the severity of the abnormal event. From S610, method 600 proceeds to S612.

At S612, the server provides a processing solution to address the abnormal event based on the cause from the determined record. In particular, the server produces a solution to solve the issue caused by the abnormal event as described by the retrieved record with the largest weight. For example, the acquisition request may include a misspelled URL, and the acquisition response indicates that the web page is not successfully obtained. The server can produce a solution, after retrieving a record from the database that matches attribute information of the user that the URL in the acquisition request was incorrectly typed and to type in a correctly spelled URL. After S612, the method stops.

The process described above is intended to obtain interaction data between a user and a server. If an abnormal event is detected in the interaction data, the attribute information of the user is obtained; and the locally stored first correspondence between the attribute information corresponding to the abnormal event, the cause of the abnormal event, and the weight characterizing the severity of the abnormal event is searched to identify the record that includes the obtained attribute information and the largest weight. The server retrieves the cause of the abnormal event in the record with the largest weight, and this cause is determined to be the cause of the abnormal event. In particular, the user does not need to communicate with the customer service representative regarding an issue of interactions between the user and the server. Additionally, the customer service representative does not need to determine the cause of the abnormal event by communicating with the user, and the cause of the abnormal event can be determined by using the attribute information of the user and the first correspondence between the attribute information corresponding to the abnormal event, the cause of the abnormal event, and the weight characterizing the severity of the abnormal event. As a result, this system automatically performs debugging of an abnormal event and providing a response to address the abnormal event. In addition, this system and methodology saves labor costs for the user.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method performed by one or more processors, comprising:
    obtaining, by the one or more processors, interaction data between a client device and a server;
    determining, by the one or more processors, whether an abnormal event exists in the obtained interaction data;
    in response to determining that the abnormal event exists in the obtained interaction data, obtaining, by the one or more processors, attribute information of a user corresponding to the client device from the obtained interaction data;
    identifying, by the one or more processors, one or more records in a database, each record including the attribute information, a cause of one or more previous abnormal events, and a weight characterizing a severity of the previous abnormal events;
    determining, by the one or more processors, a cause of the abnormal event, wherein the determined cause is the same as the cause of the previous abnormal events from the record in the identified one or more records that includes a largest weight; and
    providing, by the one or more processors, a solution to address the abnormal event based on the determined cause.

2. The computer-implemented method of claim 1, further comprising:
    determining, by the one or more processors, an occurrence of a plurality of abnormal events in the obtained interaction data;
    sorting, by the one or more processors, the plurality of abnormal events in a predetermined abnormal event order; and
    executing, by the one or more processors, in a sequential order of the sorted plurality of abnormal events, the sorted plurality of abnormal events based on causes for each abnormal event in the sorted plurality of abnormal events.

3. The computer-implemented method of claim 1, wherein the weight characterizing the severity of the abnormal event includes a quantity of times the abnormal event occurred.

4. The computer-implemented method of claim 1, further comprising: executing, by the one or more processors, the solution to address abnormal event to produce a processing result.

5. The computer-implemented method of claim 4, further comprising: receiving, by the one or more processors, feedback data from a user of the client device based on the processing result obtained from the server after processing the abnormal event.

6. The computer-implemented method of claim 5, wherein the feedback data comprises an indication of an agreement on the executed solution or an indication of a disagreement on the executed solution, as indicated by the user at the client device.

7. The computer-implemented method of claim 1, wherein identifying the one or more records in the database further comprises:
- comparing, by the one or more processors, attribute information from each of the one or more records in the database to the attribute information from the obtained interaction data; and
- in response to comparing the attribute information from each of the one or more records in the database to the attribute information found in the obtained interaction data, determining, by the one or more processors, a match between the attribute information from at least one of the one or more records to the attribute information from the obtained interaction data.

8. A non-transitory, computer-readable medium storing one or more instructions executable by a computer system to perform operations comprising:
- obtaining, by one or more processors, interaction data between a client device and a server;
- determining, by the one or more processors, whether an abnormal event exists in the obtained interaction data;
- in response to determining that the abnormal event exists in the obtained interaction data, obtaining, by the one or more processors, attribute information of a user corresponding to the client device from the obtained interaction data;
- identifying, by the one or more processors, one or more records in a database, each record including the attribute information, a cause of one or more previous abnormal events, and a weight characterizing a severity of the previous abnormal events;
- determining, by the one or more processors, a cause of the abnormal event, wherein the determined cause is the same as the cause of the previous abnormal events from the record in the identified one or more records that includes a largest weight; and
- providing, by the one or more processors, a solution to address the abnormal event based on the determined cause.

9. The non-transitory, computer-readable medium of claim 8, the operations further comprising:
- determining, by the one or more processors, an occurrence of a plurality of abnormal events in the obtained interaction data;
- sorting, by the one or more processors, the plurality of abnormal events in a predetermined abnormal event order; and
- executing, by the one or more processors, in a sequential order of the sorted plurality of abnormal events, the sorted plurality of abnormal events based on causes for each abnormal event in the sorted plurality of abnormal events.

10. The non-transitory, computer-readable medium of claim 8, wherein the weight characterizing the severity of the abnormal event includes a quantity of times the abnormal event occurred.

11. The non-transitory, computer-readable medium of claim 8, the operations further comprising: executing, by the one or more processors, the solution to address abnormal event to produce a processing result.

12. The non-transitory, computer-readable medium of claim 11, the operations further comprising: receiving, by the one or more processors, feedback data from a user of the client device based on the processing result obtained from the server after processing the abnormal event.

13. The non-transitory, computer-readable medium of claim 12, wherein the feedback data comprises an indication of an agreement on the executed solution or an indication of a disagreement on the executed solution, as indicated by the user at the client device.

14. The non-transitory, computer-readable medium of claim 8, wherein identifying the one or more records in the database further comprises:
- comparing, by the one or more processors, attribute information from each of the one or more records in the database to the attribute information from the obtained interaction data; and
- in response to comparing the attribute information from each of the one or more records in the database to the attribute information found in the obtained interaction data, determining, by the one or more processors, a match between the attribute information from at least one of the one or more records to the attribute information from the obtained interaction data.

15. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
    - obtaining, by one or more processors, interaction data between a client device and a server;
    - determining, by the one or more processors, whether an abnormal event exists in the obtained interaction data;
    - in response to determining that the abnormal event exists in the obtained interaction data, obtaining, by the one or more processors, attribute information of a user corresponding to the client device from the obtained interaction data;
    - identifying, by the one or more processors, one or more records in a database, each record including the attribute information, a cause of one or more previous abnormal events, and a weight characterizing a severity of the previous abnormal events;
    - determining, by the one or more processors, a cause of the abnormal event, wherein the determined cause is the same as the cause of the previous abnormal events from the record in the identified one or more records that includes a largest weight; and
    - providing, by the one or more processors, a solution to address the abnormal event based on the determined cause.

16. The computer-implemented system of claim 15, the operations further comprising:
- determining, by the one or more processors, an occurrence of a plurality of abnormal events in the obtained interaction data;
- sorting, by the one or more processors, the plurality of abnormal events in a predetermined abnormal event order; and
- executing, by the one or more processors, in a sequential order of the sorted plurality of abnormal events, the sorted plurality of abnormal events based on causes for each abnormal event in the sorted plurality of abnormal events.

17. The computer-implemented system of claim 15, wherein the weight characterizing the severity of the abnormal event includes a quantity of times the abnormal event occurred.

18. The computer-implemented system of claim 15, the operations further comprising: executing, by the one or more processors, the solution to address abnormal event to produce a processing result.

19. The computer-implemented system of claim 18, the operations further comprising: receiving, by the one or more processors, feedback data from a user of the client device based on the processing result obtained from the server after processing the abnormal event.

20. The computer-implemented system of claim 19, wherein the feedback data comprises an indication of an agreement on the executed solution or an indication of a disagreement on the executed solution, as indicated by the user at the client device.

* * * * *

UNITED STATES PATENT AND TRADEMARK OFFICE
CERTIFICATE OF CORRECTION

PATENT NO. : 10,678,624 B2  
APPLICATION NO. : 15/975602  
DATED : June 9, 2020  
INVENTOR(S) : Lu Liu Page 1 of 1

It is certified that error appears in the above-identified patent and that said Letters Patent is hereby corrected as shown below:

In the Claims

Column 16/Line 23 – In Claim 1, delete "data;" and insert -- data, wherein the attribute information of the user comprises information stored in an account of the user; --, therefor.

Column 17/Line 26 – In Claim 8, delete "data;" and insert -- data, wherein the attribute information of the user comprises information stored in an account of the user; --, therefor.

Column 18/Line 36 – In Claim 15, delete "data;" and insert -- data, wherein the attribute information of the user comprises information stored in an account of the user; --, therefor.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*